United States Patent [19]
Portnoy

[11] Patent Number: 4,680,128
[45] Date of Patent: Jul. 14, 1987

[54] ANIONIC COPOLYMERS FOR IMPROVED CONTROL OF DRILLING FLUID RHEOLOGY

[75] Inventor: Robert C. Portnoy, Houston, Tex.

[73] Assignee: Exxon Chemical Patents Inc., Linden, N.J.

[21] Appl. No.: 727,454

[22] Filed: Apr. 26, 1985

[51] Int. Cl.$^4$ ................................................. C09K 7/02
[52] U.S. Cl. ................................. 252/8.511; 252/8.51
[58] Field of Search .......................... 252/8.5 C, 8.5 A

[56] References Cited
U.S. PATENT DOCUMENTS

| 2,552,775 | 3/1951 | Fischer et al. | 252/8.5 |
| 2,650,905 | 9/1973 | Fordyce et al. | 252/8.5 |
| 2,718,497 | 9/1955 | Oldham et al. | 252/8.5 |
| 3,134,686 | 5/1964 | Baechtold | 526/240 X |
| 3,203,938 | 8/1965 | Baechtold | 252/8.5 |
| 3,629,101 | 12/1971 | Hille et al. | 252/8.5 |
| 4,554,307 | 11/1985 | Farrar et al. | 524/425 |

Primary Examiner—Herbert B. Guynn
Attorney, Agent, or Firm—R. A. Dexter; R. L. Graham

[57] ABSTRACT

Low molecular weight copolymers of acrylic acid and salts of vinylsulfonic acid are superior dispersants and high temperature deflocculants for the stabilization of the rheological properties of aqueous claybased drilling fluids subjected to high levels of calcium ion contamination.

3 Claims, No Drawings

ANIONIC COPOLYMERS FOR IMPROVED CONTROL OF DRILLING FLUID RHEOLOGY

FIELD OF THE INVENTION

This invention relates to dispersant additives for aqueous drilling muds. More particularly, it relates to an acrylic copolymer useful as a stabilizing agent for aqueous drilling fluids used in the drilling of subterranean wells.

BACKGROUND OF THE INVENTION.

An important component of rotary drilling operations in the exploration for and production of subterranean resources is the drilling mud. Some of the most serious problems encountered in producing and maintaining effective clay-based aqueous drilling fluids are caused by the interaction of the mud with the earth formation being drilled. These interactions include contamination of the mud by formation fluids, incorporation into the mud of viscosity producing and inert drilled solids, chemical contamination by drilled solids, and heating of the mud by high temperature formations. These interactions generally cause extreme thickening of the muds and associated, costly drilling problems and delays.

One significant type of contaminant is minerals containing divalent ions such as calcium and magnesium. These materials can cause uncontrolled thickening of the mud and large increases in filtration of fluids from the mud into permeable formations. These minerals can be sourced from: the formation solids cut by the drill bit; formation fluids; or, the cement placed intentionally in the borehole during casing or shut-off operations and cut by the drill bit when drilling is resumed.

The effect of high temperature on the mud is also especially significant. Not only does heat itself cause flocculation of the mud, but it also increases the thickening effects of chemical contaminants such as calcium chloride, and other species and deactivates or destroys many mud thinners used to stabilize muds to these effects. As drilling depth has increased, so has the bottom hole temperature. Therefore, a product is required which can protect the mud properties under the adverse conditions of today's hotter, deeper well bores.

Ammonium and alkali metal salts of polymers of acrylic acid having a weight average molecular weight ($\overline{M}w$) in excess of about 2,000 (generally desirably in the range of 5,000 to 50,000; preferably in the range of 15,000 to 35,000—see col. 5, line 69 through col. 6, line 5 of U.S. Pat. No. 2,552,775) have been taught for use as a protective colloid for water based drilling muds. Further, copolymers of acrylic acid, acrylamide, or mixtures thereof and alkali metal ethylene sulfonate have been taught as usefully employed as tanning agents, ion exchange resins, etc. and in oil well drilling muds (U.S. Pat. Nos. 3,706,717 and 3,203,938).

Over the past several years various materials have been disclosed as high temperature water based mud deflocculants. Among these are: a low molecular weight poly(acrylic acid) of $\overline{M}w$ not more than about 2500, and salts thereof (see U.S. Pat. No. 3,764,530—col. 7, lines 27-28); an acrylic acid homopolymer or salt thereof, said homopolymer having a weight average molecular weight of from about 2,500 to 5,000 which is reported to reduce the thermal flocculation of aqueous, clayey drilling fluids; polyacrylic acid having a molecular weight of from 4,000 to about 8,000 alone and with sulfonated polystyrene-maleic anhydride copolymer are reported as a high temperature dispersants for water based bentonite clay drilling fluids (see U.S. Pat. No. 4,476,029); and, a low molecular weight sulfonated copolymer of styrene and maleic anhydride (see U.S. Pat. No. 3,730,900). The last type has achieved considerable acceptance by the drilling mud industry as an effective and valuable product which is known as Mil-Temp ® and is sold by Milchem, Inc. of Houston, Tex.

In recent years, Chesser et al have suggested in the J. Pet. Tech. 950–956 (1980) that poly(acrylic acid) is unsuitable as a high temperature rheological stabilizer of aqueous muds contaminated by calcium salts and/or containing high levels of clay solids.

It is an object of this invention to obtain a dispersant for water-based drilling fluids which remains operable even at high temperatures and in the presence of high levels of calcium ion contamination.

This and further objects will become apparent as the description of the invention proceeds.

SUMMARY OF THE INVENTION

In accordance with this invention, there is provided an aqueous drilling fluid comprising a water base, a clayey material suspended in said water base, and from about 0.05 to about 12, preferably 0.25 to 8, pounds per barrel (ppb) based on the total volume of said fluid of a copolymer of acrylic acid and alkali metal vinylsulfonate with a monomer mole ratio of acrylic acid to sulfonate ranging from 50:50 to 95:5.

The above-described copolymer is a superior additive for the stabilization and deflocculation of aqueous clay-based drilling muds exposed to temperatures as high as 127° C. and in the presence of high levels of calcium contamination. These materials protect the rheological properties of clay-based muds to a surprising degree compared to other high temperature deflocculants when used either as the sole dispersant in the mud or in combination with other common thinners such as lignosulfonate.

In the process of drilling a subterranean well wherein there is circulated in the borehole of said well an aqueous drilling fluid containing suspended clayey material there is provided the inventive step which comprises admixing with said fluid from about 0.05 ppb to about 12 ppb of a copolymer of acrylic acid and sodium vinylsulfonate.

This invention arose out of the discovery that aqueous clay based drilling fluids treated with the already known low molecular weight copolymers of acrylic acid and sodium vinylsulfonate (monomer mole ratio from 50:50 to 95:5 respectively) exhibit excellent control of rheological properties, and that in the presence of calcium ion contamination, this control of rheological properties is better than in muds treated with acrylic acid homopolymers of similar molecular weight.

DESCRIPTION OF THE PREFERRED EMBODIMENT

As noted above, it has been discovered that copolymers of acrylic acid and alkali metal vinylsulfonate salts are quite beneficial in extending the effectiveness of aqueous drilling fluids by moderating increases in the rheological properties thereof when the fluid becomes contaminated with calcium ions. Copolymers having a weight average molecular weight ($\overline{M}w$) of from 1,000 to 50,000 may be utilized, though the preferred molecular weight range is 2,000 to 10,000. The monomer range of acrylic acid to vinylsulfonate will range from 1:1 to 19:1. Conventional polymerization techniques such as are disclosed in U.S. Pat. Nos. 3,706,717 and 3,203,938 which will yield low molecular weight acrylic acid copolymers are used according to the process of this invention. These techniques generally involve use of solvents, catalysts and chain transfer agents, or "stoppers" and are conducted at temperatures from about 20° C. to 100° C. Such low molecular weight copolymers of acrylic acid and vinylsulfonate are generally commercially available.

The invention also incorporates a process for reducing flocculation of aqueous drilling fluids induced or exacerbated by high temperature conditions and contaminated by high calcium ion concentration. In the field of subterranean well drilling, temperatures in excess of 175° C. are considered to represent high temperature conditions. Thus, the process of the invention appears quite useful when the aqueous drilling fluid of the invention is subjected to said high temperature operational conditions, e.g. from 175° C. to 260° C. and higher.

The amount of acrylic copolymer utilized will vary with the particular drilling environment at hand. Formation characteristics, borehole properties, drilling depth, contaminants, temperatures and pressures encountered, and drilling fluid weight will influence the determination of quantities of acrylic copolymer material to be utilized in order to achieve the desired effect. In addition, the particular properties of the selected acrylic copolymer will also influence the determination of quantities needed in the process. Because of this, it is impossible to specifically state nominal usage levels under all environments. Those skilled in the art of drilling will be able to easily determine needed ratios by testing samples obtained from the borehole; checking formation characteristics, temperatures, and pressures; and by otherwise determining the rheological properties that will be required. Nevertheless, it can be stated that, under most high temperature drilling conditions, about 2 ppb (pounds per barrel) treatment should be sufficient. It is possible under some circumstances to utilize concentrations as low as about 0.05 ppb or as high as about 12 ppb. The copolymer may be added to the drilling fluid as a pretreatment or may be added in predetermined quantities to the drilling fluid and thereafter circulated with the fluid in the well bore. The copolymer is readily adaptable to all drilling environments, being effective in fresh water, salt solutions, and in brines. A variety of drilling fluid additives may be utilized in the drilling fluid treated for reduction of thermal flocculation by the acrylic copolymer. For example, lignosulfonates, starch, bentonite, barite, lignite, quebracho, carboxymethylcellulose, and other commonly utilized additives may form the drilling fluid to which the present copolymer is additionally added for prevention of thermal degradation. Generally speaking, the drilling fluid of the present invention will have an aqueous base and have clayey material suspended therein.

The following examples will further illustrate the novel characteristics of the process of the invention and are not to be construed as limiting the scope of this invention.

EXAMPLE 1

This example demonstrates the preparation of a copolymer of acrylic acid (75 mole percent) and sodium vinylsulfonate (25 mole percent). A monomer mixture was prepared by mixing 450 g of a 25% aqueous sodium vinylsulfonate solution, 187 g of acrylic acid, 25 ml of a 1% aqueous solution of cupric sulfate pentahydrate, and sufficient water to yield 600 ml of solution. Ammonium persulfate initiator was prepared within one hour of the start of the reaction by dissolving 40.0 g of ammonium persulfate in water to make 100 ml of solution. Sodium dihydrogen hypophosphite initiator was prepared by dissolving 2.6 g of sodium dihydrogen hypophosphite dihydrate in water to make 100 ml of solution.

The monomer and initiator solutions were reacted as follows: To a refluxing heel of 100 ml of water in a resin kettle, the three solutions were added simultaneously at the rates of 6 ml/min for monomer and 0.45 ml/min for each initiator. After a period of approximately 100 min, the monomer supply was exhausted. The addition of initiators was thereafter continued for 20 min longer at reflux; reflux was then continued for still 20 min more; then 10 ml of each initiator was added at one time; and a final 20 min reflux was carried out. The pale green solution, 869-70.1, upon cooling was found to be 41.5% total copolymer solids and to have a viscosity of 33.4 cps (Brockfield LVT instrument, Spindle No. 1, 60 RPM, 20° C.). The copolymer solution was designated 869-70.

EXAMPLE 2

A material prepared similarly to that of Example 1 containing 90 mole percent acrylic acid and 10 mole % sodium vinylsulfonate contained 53.8% total solids and had a viscosity of 445 cps (Brookfield LVT instrument, Spindle No. 2 at 30 RPM, 20° C.). The copolymer solution material was designated 869-41.

EXAMPLES 3–30

By the following test, the superior deflocculating capability of the copolymer of Example 1, 869-70, compared to acrylic acid homopolymer having a $\overline{M}w$ of about 3500, was demonstrated with a Base Mud and a Green Cement.

Base Mud—A test mud was prepared by gradually adding 900 g of bentonite clay (Magcogel ® brand obtained from Magcobar Operations; Oilfield Products Group; Dresser Industries, Inc.; Houston, Tex.) to 14,000 g of Houston, Tex. tap water with strong agitation. The agitation was continued for one hour, and then the slurry was left at rest for at least 16 hours.

Green Cement—A partly cured cement was prepared for use as a calcium containing mud contaminant by mixing 164 g of water and 430 g of Lone Star API Class H Cement (Lone Star Industries, Houston, Tex.) at high speed in a Waring Blender and casting the slurry in a thin layer to dry for 16 hours. The brittle green cement was then ground to a powder and used within one day.

Procedure

Aliquots of 350 ml of the Base Mud were treated with varying levels of deflocculants and Green Cement. After addition of the deflocculant the pH of the slurry was adjusted to 10.0+0.2. Then the cement was added, and agitation was continued for about 5 minutes. No further pH adjustment was made at this time. The samples were aged at 66° C. with rolling agitation for 16 hours. Then without pH adjustment, the rheological properties of the samples were measured at 25° C. using a Fann 35 Viscometer (Fann Instrument Co.; Houston, Tex.). The pH of the samples was about 11–12.

The pH of each sample was then adjusted to 10.0+0.2 and they were aged at 66° C. with rolling for 16 hours as before. After a final adjustment of pH to 10.0+0.2, the rheological properties of each sample were again measured at 25° C.

Table I shows that at a high pH of 11–12 both the subject copolymer 869-70 and the polyacrylic acid homopolymer protected the mud from the effect of the calcium contamination relative to no deflocculant treatment. In the case of 4 lb/bbl chemical treatment and 4 lb/bbl cement contamination, copolymer 869-70 controlled yield point and gel strengths better than did the homopolymer of acrylic acid.

TABLE I

| Example Number | Chemical Treatment | Rate ppb* | Cement Contamination Rate ppb* | Plastic Viscosity cps | Yield point lb/100 ft sq | Gel Strengths 10 Sec | Gel Strengths 10 Min |
|---|---|---|---|---|---|---|---|
| 3 | 869-70[1] | 1 | 4 | 25 | 7 | 2 | 2 |
| 4 | " | 1 | 16 | 19 | 1 | 1 | 1 |
| 5 | " | 2 | 4 | 21 | 4 | 2 | 2 |
| 6 | " | 2 | 16 | 19 | 2 | 2 | 2 |
| 7 | " | 4 | 4 | 58 | 27 | 3 | 9 |
| 8 | " | 4 | 16 | 21 | 2 | 1 | 2 |
| 9 | PAA[2] | 1 | 4 | 18 | 4 | 1 | 1 |
| 10 | " | 1 | 16 | 17 | 4 | 1 | 2 |
| 11 | " | 2 | 4 | 17 | 4 | 2 | 3 |
| 12 | " | 2 | 16 | 20 | 2 | 1 | 1 |
| 13 | " | 4 | 4 | 34 | 28 | 9 | 25 |
| 14 | " | 4 | 16 | 18 | 2 | 2 | 4 |
| 15 | None | 0 | 4 | 29 | 67 | 35 | 157 |
| 16 | " | 0 | 16 | ** | ** | ** | ** |

*Pounds per 42 gallon barrel.
**Too viscous to measure on available equipment.
[1]869-70 is the copolymer of Example 1.
[2]poly(acrylic acid) of 3500 ($\overline{M}w$).

Table II shows that at pH 10 the effect of calcium contamination on the mud was more severe than at higher pH. The copolymer 869-70 controlled yield point and gel strengths, in general, better than did earlier referenced poly(acrylic acid) designated in Table II as PAA.

TABLE II

| Example Number | Chemical Treatment | Rate ppb* | Cement Contamination Rate ppb* | Plastic Viscosity cps | Yield point lb/100 ft sq | Gel Strengths 10 Sec | Gel Strengths 10 Min |
|---|---|---|---|---|---|---|---|
| 17 | 869-70[1] | 1 | 4 | 47 | 15 | 3 | 27 |
| 18 | " | 1 | 16 | 30 | 129 | 41 | 48 |
| 19 | " | 2 | 4 | 45 | 40 | 10 | 39 |
| 20 | " | 2 | 16 | 14 | 243 | 76 | 77 |
| 21 | " | 4 | 4 | 38 | 126 | 44 | 48 |
| 22 | " | 4 | 16 | 33 | 214 | 68 | 71 |
| 23 | PAA[2] | 1 | 4 | 21 | 68 | 80 | 272 |
| 24 | " | 1 | 16 | 26 | 144 | 62 | 63 |
| 25 | " | 2 | 4 | 34 | 115 | 55 | 167 |
| 26 | " | 2 | 16 | 6 | 272 | 79 | 79 |
| 27 | " | 4 | 4 | 28 | 199 | 49 | 50 |
| 28 | " | 4 | 16 | 28 | 201 | 55 | 57 |
| 29 | None | 0 | 4 | 6 | 199 | 125 | 176 |
| 30 | " | 0 | 16 | ** | ** | ** | ** |

*Pounds per 42 gallon barrel.
**Too viscous to measure on available equipment.
[1]869-70 is the copolymer of Example 1.
[2]poly(acrylic acid) of 3500 ($\overline{M}w$).

EXAMPLES 31–40

By the following test, the ability of a copolymer of Example 2, 869-41, to effectively deflocculate Complex Aqueous Drilling Muds aged at high temperature was demonstrated.

Complex Aqueous Drilling Mud—First a base mud was prepared by gradually adding 112.5 g of bentonite clay (Magcogel ®) obtained from Magcobar Operations, Oilfield Products Group, Dresser Industries, Inc. of Houston, Tex.) and 225 g of simulated drilled clay solids (Rev-Dust ®) obtained from the Milwhite Co., Inc. of Houston, Tex.) to 2,000 g of Houston, Tex. tap water with strong agitation. The agitation was continued for three hours and then the slurry was left at rest for 72 hours. This base mud was then converted into a complex laboratory mud by the following modifications. In order to provide fluidity during the addition of contaminants and weighting agent, 10 g of copolymer 869-70 of Example 1 was added to the base mud and the pH of the mud was adjusted with sodium hydroxide solution to 10.2. Then 18.0 g of sodium chloride was added followed by 1.8 g of gypsum, both additions being made with strong agitation. A density of 15.5 lb/gal was achieved by the addition to the mud of 3,600 g of barite and water sufficient to provide a final mud volume of 3,500 ml. A final period of agitation of at least one hour was provided.

Procedure

Aliquots of 350 ml of the Complex Aqueous Drilling Mud were treated with varying additional levels of the 869-41 copolymer deflocculant. After addition of the copolymer, the pH of each clurry was adjusted to 10.0+0.2. Then the samples were aged at 66° C. with rolling agitation for 16 hr. The pH of each sample was readjusted to 10.0+0.2 and the rheological properties of each were measured using a Fann 35 Viscometer (Fann Instrument Co. of Houston, Tex.). The same samples were then sealed in Baroid High Temperature Aging Cells (NL Baroid of Houston, Tex.) and aged with the rolling agitation at 205° C. for 16 hours. The pH of each sample was then adjusted and the rheological properties measured as before.

Table II shows that 869-41 provided excellent control of rheology over a broad range of concentrations in this unstable laboratory mud after both moderate and high temperature aging.

TABLE III

| Example Number | Chemical Treatment | Aging Temperature, °C. | Rate ppb Total In Mud | Plastic Viscosity cps | Yield Point lb/100 ft sq | Gel Strengths 10 sec | Gel Strengths 10 min |
|---|---|---|---|---|---|---|---|
| 31 | 869-41 | 66 | 0.5 | 50 | 18 | 3 | 62 |
| 32 | " | 66 | 1.0 | 39 | 5 | 2 | 24 |
| 33 | " | 66 | 2.0 | 32 | 3 | 2 | 4 |
| 34 | " | 66 | 4.0 | 27 | 5 | 4 | 6 |
| 35 | " | 66 | 8.0 | 29 | 8 | 5 | 7 |
| 36 | " | 205 | 0.5 | 60 | 61 | 53 | 179 |
| 37 | " | 205 | 1.0 | 79 | 61 | 4 | 113 |
| 38 | " | 205 | 2.0 | 69 | 38 | 3 | 35 |
| 39 | " | 205 | 4.0 | 62 | 29 | 6 | 29 |
| 40 | " | 205 | 8.0 | 47 | 27 | 12 | 39 |

What is claimed is:

1. An aqueous drilling fluid comprising a water base, calcium ions a clayey material suspended in said water base, calcium ions and from about 0.25 pounds per barrel (ppb) to about 8 ppb based on the total volume of said fluid of a copolymer consisting essentially of acrylic acid and alkali metal vinylsulfonate salt and having a molecular weight (Mw) of from 2,000 to 10,000, wherein the monomer mole ratio of the acrylic acid to sulfonate in the copolymer is 1:1 to 19:1.

2. The drilling fluid of claim 1 wherein said salt is sodium, and the monomer mole ratio of said acid to said sufonate in said copolymer is 3:1 to 9:1.

3. In a process for drilling a well with a rotary bit which comprises forming a borehole with said bit while circulating a water base drilling fluid through said bit and through said borehole, and in contact with the walls thereof, the improvement comprising circulating a water base fluid containing a clayey material suspended in said water base fluid, calcium ions and an effective amount of a copolymer between from about 0.25 pounds per barrel (ppb) to about 8 ppb of said fluid, said copolymer consisting essentially of from 50 to 90 mol % of acrylic acid and from 50 to 10 mol % of alkali metal vinylsulfonate salt and having a molecular weight (Mw) of between 2,000 and 10,000.

* * * * *

UNITED STATES PATENT OFFICE
CERTIFICATE OF CORRECTION

Patent No. 4,680,128　　　　　　　　　Dated July 14, 1987

Inventor(s) Robert C. Portnoy

It is certified that error appears in the above-identified patent and that said Letters Patent are hereby corrected as shown below:

Column 7, line 19, cancel "calcium ions".

Signed and Sealed this

Twenty-sixth Day of January, 1988

Attest:

DONALD J. QUIGG

Attesting Officer　　　Commissioner of Patents and Trademarks